United States Patent
Yang et al.

(10) Patent No.: US 10,511,049 B2
(45) Date of Patent: Dec. 17, 2019

(54) ELECTROLYTE SYSTEM INCLUDING ALKALI METAL BIS(FLUOROSULFONYL)IMIDE AND DIMETHYOXYETHANE FOR IMPROVING ANODIC STABILITY OF ELECTROCHEMICAL CELLS

(71) Applicant: GM Global Technology Operations LLC, Detroit, MI (US)

(72) Inventors: Li Yang, Troy, MI (US); Mei Cai, Bloomfield Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 163 days.

(21) Appl. No.: 15/677,249

(22) Filed: Aug. 15, 2017

(65) Prior Publication Data

US 2019/0058211 A1    Feb. 21, 2019

(51) Int. Cl.
*H01M 10/0525* (2010.01)
*H01M 10/0569* (2010.01)

(52) U.S. Cl.
CPC ... *H01M 10/0525* (2013.01); *H01M 10/0569* (2013.01); *H01M 2220/20* (2013.01)

(58) Field of Classification Search
CPC ......... H01M 10/0525; H01M 10/0567; H01M 10/0568; H01M 10/0569
(Continued)

(56) References Cited

U.S. PATENT DOCUMENTS 7,517,612 B2   4/2009   Ryu et al.
7,722,994 B2   5/2010   Halalay
(Continued)

FOREIGN PATENT DOCUMENTS

CN   1218422 C       9/2005
CN   100444457 C   12/2008
(Continued)

OTHER PUBLICATIONS

Jiangfeng Qian et al.; "High Rate and Stable Cycling of Lithium Metal Anode"; Nature Communications; DOI: 10.1038/ncomms7362; Feb. 20, 2015; 9 pages.
(Continued)

*Primary Examiner* — Sean P Cullen
(74) *Attorney, Agent, or Firm* — Harness, Dickey & Pierce, P.L.C.

(57) ABSTRACT

A highly-concentrated electrolyte system for an electrochemical cell is provided, along with methods of making the highly-concentrated electrolyte system. The electrolyte system includes a bound moiety having an ionization potential greater than an electron affinity and comprising one or more salts selected from the group consisting of: lithium bis(fluorosulfonyl)imide (LiFSI), sodium bis(fluorosulfonyl)imide (NaFSI), potassium bis(fluorosulfonyl)imide (KFSI), and combinations thereof bound to a solvent comprising dimethoxyethane (DME). The one or more salts have a concentration in the electrolyte system of greater than about 4M, and a molar ratio of the one or more salts to the dimethoxyethane (DME) is greater than or equal to about 1 to less than or equal to about 1.5. The one or more salts binds to the dimethoxyethane (DME) causing the electrolyte system to be substantially free of unbound dimethoxyethane (DME) and unbound bis(fluorosulfonyl)imide (FSI⁻).

10 Claims, 5 Drawing Sheets

(58) Field of Classification Search
USPC .......................................... 429/188, 307, 333
See application file for complete search history.

(56) References Cited

U.S. PATENT DOCUMENTS

| | | | |
|---|---|---|---|
| 8,394,539 | B2 | 3/2013 | Geiculescu et al. |
| 8,586,222 | B2 | 11/2013 | Timmons et al. |
| 8,802,301 | B2 | 8/2014 | Halalay et al. |
| 8,974,946 | B2 | 3/2015 | Cai et al. |
| 9,123,939 | B2 | 9/2015 | Xiao et al. |
| 9,160,036 | B2 | 10/2015 | Yang et al. |
| 9,252,411 | B2 | 2/2016 | Abd Elhamid et al. |
| 9,302,914 | B2 | 4/2016 | Liu et al. |
| 9,350,046 | B2 | 5/2016 | Huang |
| 9,437,871 | B2 | 9/2016 | Zhou et al. |
| 9,537,144 | B2 | 1/2017 | Huang et al. |
| 9,647,254 | B2 | 5/2017 | Dadheech et al. |
| 9,742,028 | B2 | 8/2017 | Zhou et al. |
| 10,056,590 | B2 | 8/2018 | Huang et al. |
| 10,062,898 | B2 | 8/2018 | Xiao |
| 10,084,204 | B2 | 9/2018 | Dai et al. |
| 2002/0102466 | A1 | 8/2002 | Hwang et al. |
| 2005/0053839 | A1 | 3/2005 | Ryu et al. |
| 2011/0111308 | A1 | 5/2011 | Halalay et al. |
| 2011/0250478 | A1 | 10/2011 | Timmons et al. |
| 2012/0109503 | A1 | 5/2012 | Yang et al. |
| 2013/0337347 | A1 | 12/2013 | Pol et al. |
| 2014/0170459 | A1 | 6/2014 | Wang et al. |
| 2015/0056387 | A1 | 2/2015 | Dadheech et al. |
| 2015/0056493 | A1 | 2/2015 | Dadheech et al. |
| 2015/0056507 | A1 | 2/2015 | Dadheech et al. |
| 2015/0118535 | A1 | 4/2015 | Smith et al. |
| 2015/0236324 | A1 | 8/2015 | Xiao et al. |
| 2015/0236372 | A1* | 8/2015 | Yushin ................ H01M 10/052 429/126 |
| 2015/0349307 | A1 | 12/2015 | Dadheech et al. |
| 2016/0017268 | A1 | 1/2016 | Kim et al. |
| 2016/0111721 | A1 | 4/2016 | Xiao et al. |
| 2016/0141598 | A1 | 5/2016 | Dai et al. |
| 2016/0172665 | A1 | 6/2016 | Zhou et al. |
| 2016/0172681 | A1* | 6/2016 | Yang ................ H01M 10/0568 429/126 |
| 2016/0172706 | A1 | 6/2016 | Xiao et al. |
| 2016/0172710 | A1 | 6/2016 | Liu et al. |
| 2016/0211498 | A1 | 7/2016 | Kim et al. |
| 2016/0218342 | A1 | 7/2016 | Xiao et al. |
| 2016/0233549 | A1* | 8/2016 | Tiruvannamalai .......................... H01M 10/0569 |
| 2016/0254567 | A1 | 9/2016 | Cai et al. |
| 2016/0344063 | A1* | 11/2016 | Chang ................ H01M 10/0569 |
| 2017/0162859 | A1 | 6/2017 | Yang et al. |
| 2017/0214079 | A1 | 7/2017 | Dai et al. |
| 2017/0222210 | A1 | 8/2017 | Xiao |
| 2017/0271678 | A1 | 9/2017 | Yang et al. |
| 2017/0288230 | A1 | 10/2017 | Yang et al. |
| 2017/0338490 | A1 | 11/2017 | Xiao et al. |
| 2018/0048022 | A1 | 2/2018 | Yang et al. |
| 2018/0062206 | A1 | 3/2018 | Yang et al. |
| 2018/0108952 | A1 | 4/2018 | Yang et al. |
| 2018/0287207 | A1 | 10/2018 | Dai et al. |
| 2018/0309165 | A1 | 10/2018 | Yersak et al. |
| 2018/0309166 | A1 | 10/2018 | Yersak et al. |
| 2018/0375148 | A1 | 12/2018 | Yersak et al. |
| 2019/0044134 | A1 | 2/2019 | Liu et al. |
| 2019/0058210 | A1 | 2/2019 | Dai et al. |
| 2019/0058211 | A1 | 2/2019 | Yang et al. |
| 2019/0058219 | A1 | 2/2019 | Yang et al. |
| 2019/0067675 | A1 | 2/2019 | Xiao |
| 2019/0067744 | A1 | 2/2019 | Xiao et al. |
| 2019/0089006 | A1 | 3/2019 | Yang et al. |

FOREIGN PATENT DOCUMENTS

| | | | |
|---|---|---|---|
| CN | 102306835 | A | 1/2012 |
| CN | 105280953 | A | 1/2016 |
| CN | 109411823 | A | 3/2019 |
| CN | 109411827 | A | 3/2019 |
| DE | 102015111777 | A1 | 1/2016 |
| DE | 102018119665 | A1 | 2/2019 |
| DE | 102018119769 | A1 | 2/2019 |
| JP | 2008198524 | A * | 8/2008 |
| WO | 2013155038 | A1 | 10/2013 |

OTHER PUBLICATIONS

Fei Ding et al.; "Effects of Carbonate Solvents and Lithium Salts on Morphology and Coulombic Efficiency of Lithium Electrode"; Journal of the Electrochemical Society; pp. A1894-A1901; Sep. 4, 2013; 8 pages.

Vinodkumar Etacheri et al.; "Challenges in the Development of Advanced Li-Ion Batteries: A Review"; Energy & Environmental Science, DOI:10.1039/c1ee01598b; www.rsc.org/ees; Jul. 26, 2011; 21 pages.

Yang, Li et al.; U.S. Appl. No. 15/856,292, filed Dec. 28, 2017 entitled "Electrolyte System for Lithium-Chalcogen Batteries"; 41 pages.

First Office Action for Chinese Application No. 201510629022.9 dated May 15, 2017 with English language machine translation; 5 pages.

Second Office Action for Chinese Application No. 201510629022.9 dated Nov. 23, 2017 with English language machine translation; 14 pages.

Chen, Shuru et al., "Exceptional electrochemical performance of rechargeable Li-S batteries with a polysultice-contianing electrolyte," RSC Adv. 2013, 3, pp. 3540-3543 (Published Feb. 7, 2013); DOI: 10.1039/c3ra23070h.

Gao, Jie et al. "Effects of Liquid Electrolytes on the Charge Discharge Performance of Rechargeable Lithium/Sulfur Batteries: Electrochemical and in-Situ X-ray Absorption Spectroscopic Studies" J. Phys. Chem. C 2011, 115, 25132-25137.

Xu, Riu et al., "Role of Polysulfides in Self-Healing Lithium-Sulfur Batteries," Adv. Energy Mater. 2013, 3, 833-838 (Published online Feb. 18, 2013); DOI: 10.1002/aenm.201200990.

* cited by examiner

ELECTROLYTE SYSTEM INCLUDING ALKALI METAL BIS(FLUOROSULFONYL)IMIDE AND DIMETHYOXYETHANE FOR IMPROVING ANODIC STABILITY OF ELECTROCHEMICAL CELLS

INTRODUCTION

This section provides background information related to the present disclosure which is not necessarily prior art.

The present disclosure pertains to a highly-concentrated ether-based electrolyte system of an electrochemical cell including a high-energy cathode and a lithium-containing anode, along with methods of making the highly-concentrated electrolyte system and electrochemical cells including the highly-concentrated electrolyte system. The electrolyte system includes a bound moiety including one or more salts associated with and/or bound to an ether-based solvent, wherein the one or more salts have a concentration in the electrolyte system of greater than about 4M and a molar ratio of the one or more salts to the ether of the ether-based solvent is greater than or equal to about 1 to less than or equal to about 1.5. The bound moiety of the electrolyte system improves or supports the anodic stability of the electrochemical cell By way of background, high-energy density, electrochemical cells, such as lithium-ion batteries can be used in a variety of consumer products and vehicles, such as Hybrid Electric Vehicles (HEVs) and Electric Vehicles (EVs). Typical lithium-ion batteries comprise a first electrode, a second electrode, an electrolyte material, and a separator. One electrode serves as a positive electrode or cathode and another serves as a negative electrode or anode. A stack of lithium-ion battery cells may be electrically connected to increase overall output. Conventional rechargeable lithium-ion batteries operate by reversibly passing lithium ions back and forth between the negative electrode and the positive electrode. A separator and an electrolyte are disposed between the negative and positive electrodes. The electrolyte is suitable for conducting lithium-ions and may be in solid (e.g., solid state diffusion) or liquid form. Lithium-ions move from a cathode (positive electrode) to an anode (negative electrode) during charging of the battery, and in the opposite direction when discharging the battery.

Many different materials may be used to create components for a lithium-ion battery. By way of non-limiting example, cathode materials for lithium-ion batteries typically comprise an electroactive material which can be intercalated or alloyed with lithium ions, such as lithium-transition metal oxides or mixed oxides of the spinel type, for example including spinel $LiMn_2O_4$, $LiCoO_2$, $LiNiO_2$, $LiMn_{1.5}Ni_{0.5}O_4$, $LiNi_{(1-x-y)}Co_xM_yO_2$ (where 0<x<1, y<1, and M may be Al, Mn, or the like), or lithium iron phosphates. The electrolyte typically contains one or more lithium salts, which may be dissolved and ionized in a non-aqueous solvent. Common negative electrode materials include lithium insertion materials or alloy host materials, like carbon-based materials, such as lithium-graphite intercalation compounds, or lithium-silicon compounds, lithium-tin alloys, and lithium titanate $Li_{4+x}Ti_5O_{12}$, where 0≤x≤3, such as $Li_4Ti_5O_{12}$ (LTO).

The negative electrode may also be made of a lithium-containing material, such as metallic lithium, so that the electrochemical cell is considered a lithium metal battery or cell. Metallic lithium for use in the negative electrode of a rechargeable battery has various potential advantages, including having the highest theoretical capacity and lowest electrochemical potential. Thus, batteries incorporating lithium metal anodes can have a higher energy density that can potentially double storage capacity, so that the battery may be half the size, but still last the same amount of time as other lithium ion batteries. Thus, lithium metal batteries are one of the most promising candidates for high energy storage systems. However, lithium metal batteries also have potential downsides, including possibly exhibiting unreliable or diminished performance and potential premature electrochemical cell failure.

For example, side reactions may occur between the lithium metal and species in the adjacent electrolyte disposed between the positive and negative electrodes promoting performance degradation with lithium negative electrodes, which can compromise coulombic efficiency and cycling lifetime of rechargeable lithium batteries. Accordingly, it would be desirable to develop materials for use in high energy lithium-ion batteries that reduce or suppress lithium metal side reactions thereby similarly suppressing or minimizing effects resulting therefrom.

SUMMARY

This section provides a general summary of the disclosure, and is not a comprehensive disclosure of its full scope or all of its features.

In various aspects, the present disclosure provides a method of preparing an electrolyte system that enhances or optimizes an anodic stability of an electrochemical cell that may include a positive electrode and a negative electrode. The positive electrode may include a positive lithium-based electroactive material having a maximum potential greater than or equal to about 5V. The negative electrode may include a negative electroactive material that comprises lithium. The method may include mixing one or more salts selected from the group consisting of: lithium bis(fluorosulfonyl)imide (LiFSI), sodium bis(fluorosulfonyl)imide (NaFSI), potassium bis(fluorosulfonyl)imide (KFSI), and combinations thereof and a solvent comprising dimethoxyethane (DME) to form a bound moiety. The bound moiety may have an ionization potential greater than an electron affinity to form an electrolyte system that is substantially free of unbound dimethoxyethane (DME) and unbound bis(fluorosulfonyl)imide (FSI⁻). The one or more salts may have a concentration in the electrolyte system of greater than about 4M. A molar ratio of the one or more salts to the dimethoxyethane (DME) may be greater than or equal to about 1 to less than or equal to about 1.5.

In one aspect, the electrolyte system may have a dynamic viscosity of less than about 100 centipoise (cP).

In one aspect, the electrochemical cell may have an energy density of greater than about 900 Wh/L.

In one aspect, the electrolyte system may include one or more electrolyte additives. The electrolyte additives may be selected from the group consisting of: organic silane electrolyte additives, borate based electrolyte additives, and combinations thereof.

In one aspect, the one or more electrolyte additives may include an organic silane electrolyte additive selected from the group consisting of: fluorinated methoxysilanes, fluorinated chlorosilanes, and combinations thereof.

In one aspect, the electrolyte system may include one or more electrolyte additives selected from the group consisting of: 3,3,3-trifluoropropylmethyldimethoxysilane, (3,3,3-trifluoropropyl)trimethoxysilane, 1H,1H,2H,2H-perfluorooctylmethyldimethoxysilane, 1H,1H,2H,2H- perfluorooctyltrimethoxysilane, 1H,1H,2H,2H-perfluorooctyldimethylchlorosilane, 1H,1H,2H,2H-perfluorooctylmethyldichlorosilane, (1H,1H,2H,2H-perfluoro-n-hexyl)methyldichlorosilane, 1H,1H,2H,2H-perfluorooctyltrichlorosilane, and combinations thereof.

In one aspect, the positive lithium-based electroactive material may include elemental sulfur or a sulfur-containing active material.

In one aspect, the positive lithium-based electroactive material may be selected from the group consisting of: nickel-manganese-cobalt 811 (NMC811); nickel-manganese-cobalt 622 (NMC622); lithium cobalt oxide (LiCoO$_2$); lithium iron phosphate (LiFePO$_4$); high-energy nickel-manganese-cobalt-oxide (HENMC) (e.g., over-lithiated layered oxide cathode or lithium-rich NMC); lithium-manganese-nickel-oxide (LMNO); and combinations thereof.

In another variation, the present disclosure provides another method of improving or optimizing anodic stability of an electrochemical cell that cycles lithium-ions. The method may include introducing an electrolyte system into the electrochemical cell. The electrolyte system may include a bound moiety having an ionization potential greater than an electron affinity. The electrolyte system may include one or more salts bound to a solvent. The electrolyte system may include one or more salts having a concentration in the electrolyte system of greater than 4M. The one or more salts may be selected from the group consisting of: lithium bis(fluorosulfonyl)imide (LiFSI), sodium bis(fluorosulfonyl)imide (NaFSI), potassium bis(fluorosulfonyl)imide (KFSI), and combinations thereof and the solvent may comprise dimethoxyethane (DME). A molar ratio of the one or more salts to the dimethoxyethane (DME) may be greater than or equal to about 1 to less than or equal to about 1.5. The electrolyte system may be substantially free of unbound dimethoxyethane (DME) and unbound bis(fluorosulfonyl) imide (FSI$^-$).

In one aspect, the electrochemical cell may include a positive electrode and a negative electrode. The positive electrode may include a positive lithium-based electroactive material having a maximum potential greater than or equal to about 5V. The negative electrode may have a negative electrolyte material comprising lithium.

In one aspect, the electrolyte system may have a dynamic viscosity of 100 centipoise (cP).

In one aspect, the electrochemical cell may have an energy density of greater than about 900 Wh/L.

In one aspect, the electrolyte system may include one or more electrolyte additives. The electrolyte additives may be selected from the group consisting of: organic silane electrolyte additives, borate based electrolyte additives, and combinations thereof.

In another variation, the present disclosure provides an electrochemical cell that cycles lithium-ions having improved or optimized anodic stability. The electrochemical cell may include a positive electrode, a separator, a negative electrode, and an electrolyte system. The positive electrode may include a positive lithium-based electroactive material and may have a maximum potential greater than or equal to about 5V. The negative electrode may include a negative electroactive material including lithium. The electrolyte system may include a bound moiety having an ionization potential greater than an electron affinity and may comprise one or more salts bound to a solvent. The one or more salts may be selected from the group consisting of: lithium bis(fluorosulfonyl)imide (LiFSI), sodium bis(fluorosulfonyl)imide (NaFSI), potassium bis(fluorosulfonyl)imide (KFSI), and combinations thereof and the solvent may comprise dimethoxyethane (DME). The one or more salts may have a concentration in the electrolyte system of greater than 4M. A molar ratio of the one or more salts to the dimethoxyethane (DME) may be greater than or equal to about 1 to less than or equal to about 1.5. The electrolyte system may be substantially free of unbound dimethoxyethane (DME) and unbound bis(fluorosulfonyl)imide (FSI$^-$).

In one aspect, the electrolyte system may have a dynamic viscosity of 100 centipoise (cP).

In one aspect, the electrochemical cell may have an energy density of greater than about 900 Wh/L.

In one aspect, the electrolyte system may include one or more electrolyte additives. The electrolyte additives may be selected from the group consisting of: organic silane electrolyte additives, borate based electrolyte additives, and combinations thereof.

In one aspect, the one or more electrolyte additives may include an organic silane electrolyte additive selected from the group consisting of: fluorinated methoxysilanes, fluorinated chlorosilanes, and combinations thereof.

In one aspect, the electrolyte system may include one or more electrolyte additives selected from the group consisting of: 3,3,3-trifluoropropylmethyldimethoxysilane, (3,3,3-trifluoropropyl)trimethoxysilane, 1H,1H,2H,2H-perfluorooctylmethyldimethoxysilane, 1H,1H,2H,2H-perfluorooctyltrimethoxysilane, 1H,1H,2H,2H-perfluorooctyldimethylchlorosilane, 1H,1H,2H,2H-perfluorooctylmethyldichlorosilane, (1H,1H,2H,2H-perfluoro-n-hexyl)methyldichlorosilane, 1H,1H,2H,2H-perfluorooctyltrichlorosilane, and combinations thereof.

In one aspect, the positive lithium-based electroactive material may include elemental sulfur or a sulfur-containing active material.

In one aspect, the positive lithium-based electroactive material may be selected from the group consisting of: nickel-manganese-cobalt 811 (NMC811); nickel-manganese-cobalt 622 (NMC622); lithium cobalt oxide (LiCoO$_2$); lithium iron phosphate (LiFePO$_4$); high-energy nickel-manganese-cobalt-oxide (HENMC) (e.g., over-lithiated layered oxide cathode or lithium-rich NMC); lithium-manganese-nickel-oxide (LMNO); and combinations thereof.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
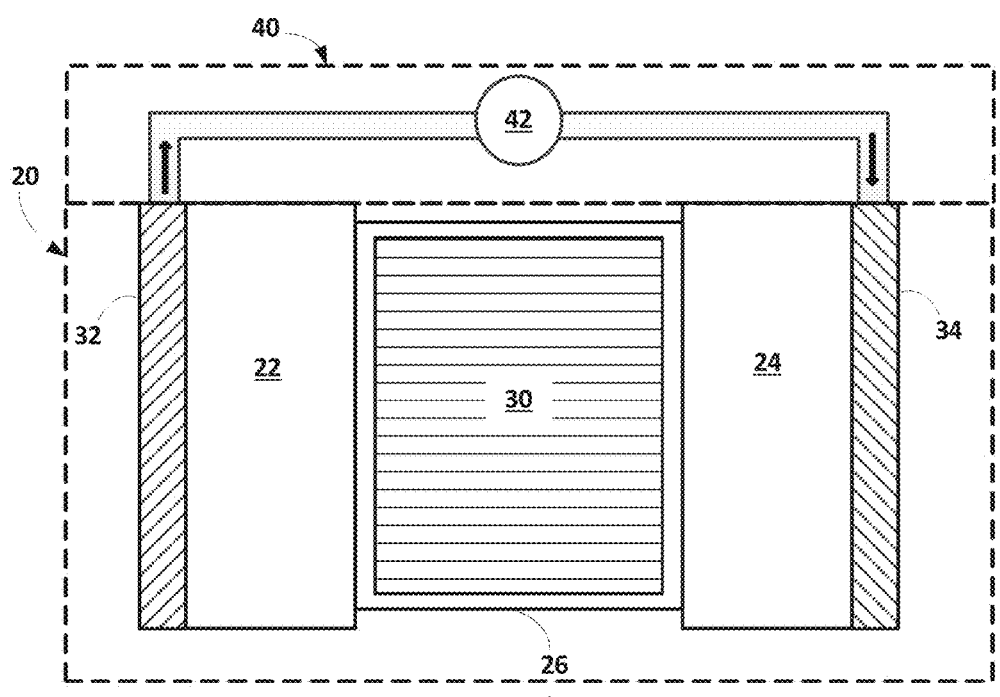
FIG. 1 is a schematic of an exemplary electrochemical battery cell including a lithium-containing negative electrode.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to improved electrochemical cells, especially lithium-ion or more particularly lithium-metal batteries, which may be used in vehicle applications. However, the present technology may also be used in other electrochemical devices; especially those that comprise lithium, such as lithium-sulfur batteries. Thus, the discussion of a lithium-ion battery herein is non-limiting.

An exemplary and schematic illustration of a battery 20 that cycles lithium ions is shown in FIG. 1. Battery 20 includes a negative electrode 22, a positive electrode 24, and a porous separator 26 (e.g., a microporous or nanoporous polymeric separator) disposed between the two electrodes 22, 24. The porous separator 26 includes an electrolyte 30, which may also be present in the negative electrode 22 and positive electrode 24. A negative electrode current collector 32 may be positioned at or near the negative electrode 22, and a positive electrode current collector 34 may be positioned at or near the positive electrode 24. The negative electrode current collector 32 and positive electrode current collector 34 respectively collect and move free electrons to and from an external circuit 40. An interruptible external circuit 40 and load device 42 connects the negative electrode 22 (through its current collector 32) and the positive electrode 24 (through its current collector 34).

The porous separator 26 operates as both an electrical insulator and a mechanical support, by being sandwiched between the negative electrode 22 and the positive electrode 24 to prevent physical contact and thus, the occurrence of a short circuit. The porous separator 26, in addition to providing a physical barrier between the two electrodes 22, 24, can provide a minimal resistance path for internal passage of lithium ions (and related anions) during cycling of the lithium ions to facilitate functioning of the battery 20. While in lithium-ion batteries, lithium intercalates and/or alloys in the electrode active materials, in a lithium sulfur battery, instead of intercalating or alloying, the lithium dissolves from the negative electrode and migrates to the positive electrode where it reacts/plates during discharge, while during charging, lithium plates on the negative electrode.

The battery 20 can be charged or re-energized at any time by connecting an external power source to the battery 20 to reverse the electrochemical reactions that occur during battery discharge. The connection of an external power source to the battery 20 compels the production of electrons and release of lithium ions from the positive electrode 25. The electrons, which flow back towards the negative electrode 22 through the external circuit 40, and the lithium ions, which are carried by the electrolyte 30 across the separator 26 back towards the negative electrode 22, reunite at the negative electrode 22 and replenish it with lithium for consumption during the next battery discharge cycle. As such, each discharge and charge event is considered to be a cycle, where lithium ions are cycled between the positive electrode 24 and negative electrode 22.

The external power source that may be used to charge the battery 20 may vary depending on the size, construction, and particular end-use of the battery 20. Some notable and exemplary external power sources include, but are not limited to, an AC wall outlet and a motor vehicle alternator. In many lithium-ion battery configurations, each of the negative electrode current collector 32, negative electrode 22, the separator 26, positive electrode 24, and positive electrode current collector 34 are prepared as relatively thin layers (for example, from several microns to a millimeter or less in thickness) and assembled in layers connected in electrical parallel arrangement to provide a suitable electrical energy and power package.

Furthermore, the battery 20 can include a variety of other components that while not depicted here are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26, by way of non-limiting example. As noted above, the size and shape of the battery 20 may vary depending on the particular application for which it is designed. Battery-powered vehicles and handheld consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42.

Accordingly, the battery 20 can generate electric current to a load device 42 that can be operatively connected to the external circuit 40. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be a power-generating apparatus that charges the battery 20 for purposes of storing energy. In certain other variations, the electrochemical cell may be a supercapacitor, such as a lithium-ion based supercapacitor.

With renewed reference to FIG. 1, the porous separator 26 may include, in certain instances, a microporous polymeric separator including a polyolefin, by way of non-limiting example. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of PE and PP, or multi-layered structured porous films of PE and/or PP. Commercially available polyolefin porous membranes 26 include CELGARD® 2500 (a monolayer polypropylene separator) and CELGARD® 2320 (a trilayer polypropylene/polyethylene/polypropylene separator) available from Celgard LLC.

When the porous separator 26 is a microporous polymeric separator, it may be a single layer or a multi-layer laminate, which may be fabricated from either a dry or wet process. For example, in one embodiment, a single layer of the polyolefin may form the entire microporous polymer separator 26. In other aspects, the separator 26 may be a fibrous membrane having an abundance of pores extending between the opposing surfaces and may have a thickness of less than a millimeter, for example. As another example, however, multiple discrete layers of similar or dissimilar polyolefins may be assembled to form the microporous polymer separator 26. Furthermore, the porous separator 26 may be mixed with a ceramic material or its surface may be coated in a ceramic material. For example, a ceramic coating may include alumina ($Al_2O_3$), silicon dioxide ($SiO_2$), or combinations thereof. Various conventionally available polymers and commercial products for forming the separator 26 are contemplated, as well as the many manufacturing methods that may be employed to produce such a microporous polymer separator 26.

In various aspects, the positive electrode 24 may be formed from a lithium-based active material that can sufficiently undergo lithium intercalation and deintercalation, alloying and dealloying, or plating and stripping, while functioning as the positive terminal of the battery 20. The positive electrode 24 electroactive materials may include one or more transition metals, such as manganese (Mn), nickel (Ni), cobalt (Co), chromium (Cr), iron (Fe), vanadium (V), and combinations thereof. Two exemplary common classes of known electroactive materials that can be used to form the positive electrode 24 are lithium transition metal oxides with layered structure and lithium transition metal oxides with spinel phase.

For example, in certain instances, the positive electrode 24 may include a spinel-type transition metal oxide, like lithium manganese oxide ($Li_{(1+x)}Mn_{(2-x)}O_4$), where x is typically less than 0.15, including $LiMn_2O_4$ (LMO) and lithium manganese nickel oxide $LiMn_{1.5}Ni_{0.5}O_4$(LMNO). In other instances, the positive electrode 24 may include layered materials like lithium cobalt oxide ($LiCoO_2$), lithium nickel oxide ($LiNiO_2$), a lithium nickel manganese cobalt oxide ($Li(Ni_xMn_yCo_z)O_2$), where $0 \leq x \leq 1$, $0 \leq y \leq 1$, $0 \leq z \leq 1$, and $x+y+z=1$, including $LiMn_{0.33}Ni_{0.33}Co_{0.33}O_2$, a lithium nickel cobalt metal oxide ($LiNi_{(1-x-y)}Co_xM_yO_2$), where $0<x<1$, $0<y<1$ and M may be Al, Mn, or the like. Other known lithium-transition metal compounds such as lithium iron phosphate ($LiFePO_4$) or lithium iron fluorophosphate ($Li_2FePO_4F$) can also be used. In certain aspects, the positive electrode 24 may include an electroactive material that includes manganese, such lithium manganese oxide ($Li_{(1+x)}Mn_{(2-x)}O_4$), a mixed lithium manganese nickel oxide ($LiMn_{(2-x)}Ni_xO_4$), where $0 \leq x \leq 1$, and/or a lithium manganese nickel cobalt oxide (e.g., $LiMn_{1/3}Ni_{1/3}Co_{1/3}O_2$). In a lithium-sulfur battery, positive electrodes may have elemental sulfur as the active material or a sulfur-containing active material.

In certain variations, the electroactive material used to form the positive electrode 24 may have a maximum potential of greater than or equal to about 4V, optionally greater than or equal to about 4.8V, and in certain aspects, optionally greater than or equal to about 5V. For example, in certain instances, the positive electrode 24 may include a positive lithium-based electroactive material selected from the group consisting of nickel-manganese-cobalt 811 (NMC811); nickel-manganese-cobalt 622 (NMC622); lithium cobalt oxide ($LiCoO_2$); lithium iron phosphate ($LiFePO_4$); high-energy nickel-manganese-cobalt-oxide (HENMC) (e.g., over-lithiated layered oxide cathode or lithium-rich NMC); lithium-manganese-nickel-oxide (LMNO); and combinations thereof.

In certain variations, the positive active materials may be intermingled with an optional electrically conductive material and at least one polymeric binder material to structurally fortify the lithium-based active material along with an optional electrically conductive particle distributed therein. For example, the active materials and optional conductive materials may be slurry cast with such binders, like polyvinylidene difluoride (PVdF), polytetrafluoroethylene (PTFE), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate. Electrically conductive materials may include graphite, carbon-based materials, powdered nickel, metal particles, or a conductive polymer. Carbon-based materials may include by way of non-limiting example particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The positive electrode current collector 34 may be formed from aluminum (Al) or any other appropriate electrically conductive material known to those of skill in the art.

In various aspects, the negative electrode 22 includes an electroactive material capable of functioning as a negative terminal of the battery 20. The negative electrode 22 may thus include the electroactive material and optionally another electrically conductive material, as well as one or more polymeric binder materials to structurally hold the lithium host material together. In various aspects, the electroactive material comprises lithium and may be lithium metal. In certain variations, the negative electrode 22 is a film or layer formed of lithium metal or an alloy of lithium. As noted above, metallic lithium for use in the negative electrode (e.g., 22) of a rechargeable battery (e.g., 20) has various potential advantages, including having the highest theoretical capacity (e.g., about 3860 mAh/g ($LiC_6$: 339 mAh/g; $Li_{3.75}Si$: 1860 mAh/g)) and lowest electrochemical potential. Further, batteries (e.g., 20) incorporating lithium metal anodes (e.g., 22) may have a higher energy density (e.g., greater than or equal to about 800 Wh/L and 350 Wh/Kg) that can potentially double storage capacity.

In certain variations, the negative electrode 22 may optionally another electrically conductive material, as well as one or more polymeric binder materials to structurally hold the lithium host material together. By way of non-limiting example, the negative electrode 22 may include an active material including lithium metal particles (e.g., lithium foil) intermingled with a binder material selected from the group consisting of: polyvinylidene difluoride (PVdF), polytetrafluoroethylene (PTFE), ethylene propylene diene monomer (EPDM) rubber, or carboxymethoxyl cellulose (CMC), a nitrile butadiene rubber (NBR), lithium polyacrylate (LiPAA), sodium polyacrylate (NaPAA), sodium alginate, lithium alginate, and combinations thereof. Suitable additional electrically conductive materials may include carbon-based material or a conductive polymer. Carbon-based materials may include by way of non-limiting example, particles of KETCHEN™ black, DENKA™ black, acetylene black, carbon black, and the like. Examples of a conductive polymer include polyaniline, polythiophene, polyacetylene, polypyrrole, and the like. In certain aspects, mixtures of conductive materials may be used. The negative electrode current collector 32 may be formed from copper (Cu) or any other appropriate electrically conductive material known to those of skill in the art.

As noted, each of the separator 26, the negative electrode 22, and the positive electrode 24 may include an electrolyte system 30, capable of conducting lithium ions between the negative electrode 22 and the positive electrode 24. The electrolyte system 30 may be a non-aqueous liquid electrolyte solution including a bound moiety. The bound moiety may comprise one or more salts associated with or bound to an organic solvent or a mixture of organic solvents. In certain instances, the one or more lithium salts may be selected from the group consisting of: lithium bis(fluorosulfonyl)imide (LiFSI), sodium bis(fluorosulfonyl)imide (NaFSI), potassium bis(fluorosulfonyl)imide (KFSI), and combinations thereof and the solvent may comprise an ether-based solvent. For example, the bound moiety of the electrolyte system 30 may include one or more lithium salts selected from the group consisting of: lithium bis(fluorosulfonyl)imide (LiFSI), sodium bis(fluorosulfonyl)imide (NaFSI), potassium bis(fluorosulfonyl)imide (KFSI), and combinations thereof and a solvent comprising dimethoxyethane (DME). A molar ratio of the one or more salts to the dimethoxyethane (DME) may be greater than or equal to about 1 to less than or equal to about 1.5M. The one or more salts may have a concentration in the electrolyte system 30 of greater than 4M, optionally greater than or equal to about 4.5M, and in certain aspects, optionally greater than or equal to about 5M.

In various aspects, the electrolyte system 30 has an ionization potential greater than an electron affinity. For example, the electrolyte system 30 may have a calculated electron affinity less than or equal to about 1.5 eV; and a calculated ionization potential greater than or equal to about 10 eV. In certain instances, the electrolyte system 30 may have a dynamic viscosity of less than about 100 centipoise (cP), and a battery 20 including electrolyte system 30 may have an energy density of greater than about 900 Wh/L.

In various aspects, bound moiety of the electrolyte system 30 improves or supports the anodic stability of the battery 20 by suppressing or minimizing side reactions that may occur when the solvent and/or salts are unbound or free species in the electrolyte system 30 that may react with the lithium (Li) metal of the negative electrode 22. Side reactions may compromise coulombic efficiency and cycling lifetime of rechargeable batteries by consuming the lithium (Li) metal and electrolyte. Ether-based electrolyte systems generally experience good compatibility with lithium (Li) metal. For example, dimethoxyethane (DME) has an electron affinity of about 1.5 eV, which makes it generally compatible with lithium (Li) metal. However, ether-based electrolyte systems having low concentrations (less than about 4M, and in certain aspects, less than about 3M) may experience low anodic stability and may be suitable only for use with low voltage cathodes, such as Li—S, Li—$MoS_2$, and $LiFePO_4$ batteries wherein the cathodes have maximum potentials of less than about 3.7V. For example, dimethoxyethane (DME) has an ionization potential of less than about 7.2 eV, which allows for easy oxidization (loss of electrons) at the cathode.

Providing electrolyte systems 30 having higher concentrations of salts (e.g., greater than 4M, optionally greater than or equal to about 4.5M, and in certain aspects, optionally greater than or equal to about 5M) may enhance anodic stability and allow for the use of higher voltage cathodes (e.g., cathodes having a maximum potential greater than or equal to about 4V, optionally greater than or equal to about 4.8V, and in certain aspects, optionally greater than or equal to about 5V) at least in part because an increase salt concentration increases the ionization potential of dimethoxyethane (DME) to greater than or equal to about 10 eV. Electrolyte system 30, having an increased salt concentration and a molar ratio of the one or more salts to the dimethoxyethane (DME) is greater than or equal to about 1 to less than or equal to about 1.5, may thus be substantially free of such free or unbound compounds that promote such side reactions (e.g., oxidization at the cathode). Electrolyte system 30 may comprise less than or equal to about 0.5% by weight, optionally less than or equal to about 0.25% by weight, optionally less than or equal to about 0.1% by weight, and in certain aspects, 0% by weight of the free or unbound undesired species, like unbound salt(s) or unbound solvent(s) (e.g., dimethoxyethane (DME)).

In certain instances, the electrolyte system 30 may include one or more electrolyte additives. For example, the electrolyte system 30 may include one or more electrolyte additives selected from the group consisting of: organic silane electrolyte additives, borate based electrolyte additives, and combinations thereof. The organic silane electrolyte additive may be selected from the group consisting of fluorinated methoxysilanes, fluorinated chlorosilanes, and combinations thereof. In certain instances, the electrolyte system 30 may include one or more electrolyte additives may be selected from the group consisting of: 3,3,3-trifluoropropylmethyldimethoxysilane, (3,3,3-trifluoropropyl)trimethoxysilane, 1H,1H,2H,2H-perfluorooctylmethyldimethoxysilane, 1H,1H,2H,2H-perfluorooctyltrimethoxysilane, 1H,1H,2H,2H-perfluorooctyldimethylchlorosilane, 1H,1H,2H,2H-perfluorooctylmethyldichlorosilane, (1H,1H,2H,2H-perfluoro-n-hexyl)methyldichlorosilane, 1H,1H,2H,2H-perfluorooctyltrichlorosilane, or combinations thereof. The electrolyte system 30 may include greater than or equal to about 0.1 weight percent (wt %) to less than or equal to about 10 weight percent (wt %) of the one or more electrolyte additives.

Embodiments of the present technology are further illustrated through the following non-limiting examples.

EXAMPLE 1

Figure 2:
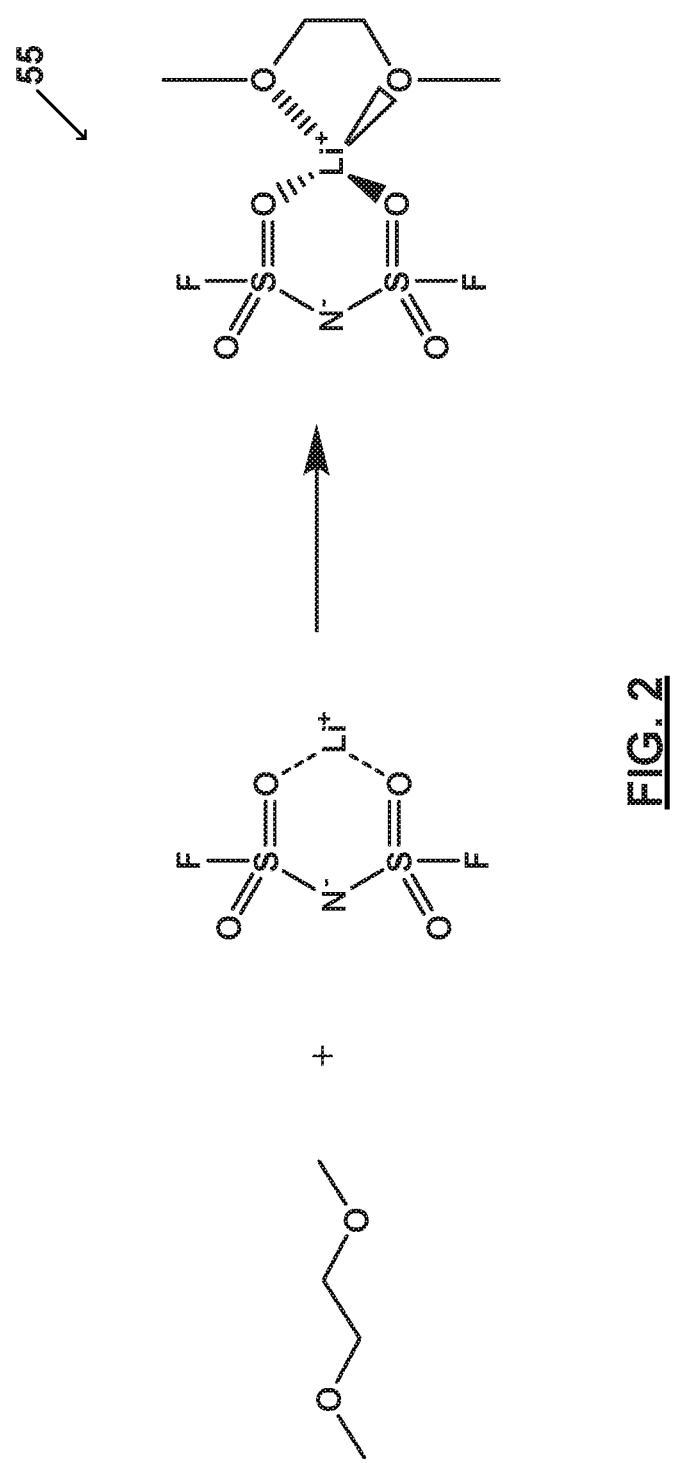
FIG. 2 shows an electrolyte system wherein one or more salts have a concentration in the electrolyte system of about 5M.

FIG. 2 illustrates an electrolyte system 55 prepared in accordance with certain aspects of the present disclosure. In particular, FIG. 2 shows an electrolyte system 55 comprising one or more salts bound to a solvent to form a bound moiety. Electrolyte system 55 includes a bound moiety comprising lithium bis(fluorosulfonyl)imide (LiFSI) and dimethoxyethane (DME). Electrolyte system 55 includes a concentration of lithium bis(fluorosulfonyl)imide (LiFSI) of about 5M and a molar ratio of the lithium bis(fluorosulfonyl)imide (LiFSI) to the dimethoxyethane (DME) of greater than or equal to about 1 to less than or equal to about 1.5.

As illustrated, substantially all of the dimethoxyethane (DME) molecules bind with lithium ($Li^+$). Thus, dimethoxyethane (DME) and bis(fluorosulfonyl)imide ($FSI^-$) may be immobilized and the electrolyte system 55 substantially free of free or unbound dimethoxyethane (DME) and free or unbound bis(fluorosulfonyl)imide ($FSI^-$). Electrolyte system 55 comprises less than or equal to about 0.5% by weight, optionally less than or equal to about 0.25% by weight, optionally less than or equal to about 0.1% by weight, and in certain aspects, 0% by weight of the free or unbound undesired species, free or unbound dimethoxyethane (DME) and free or unbound bis(fluorosulfonyl)imide ($FSI^-$). Thus, harmful side reaction are eliminated or reduced thereby increasing the anodic stability of batteries including electrolyte system 55.

Figure 3:
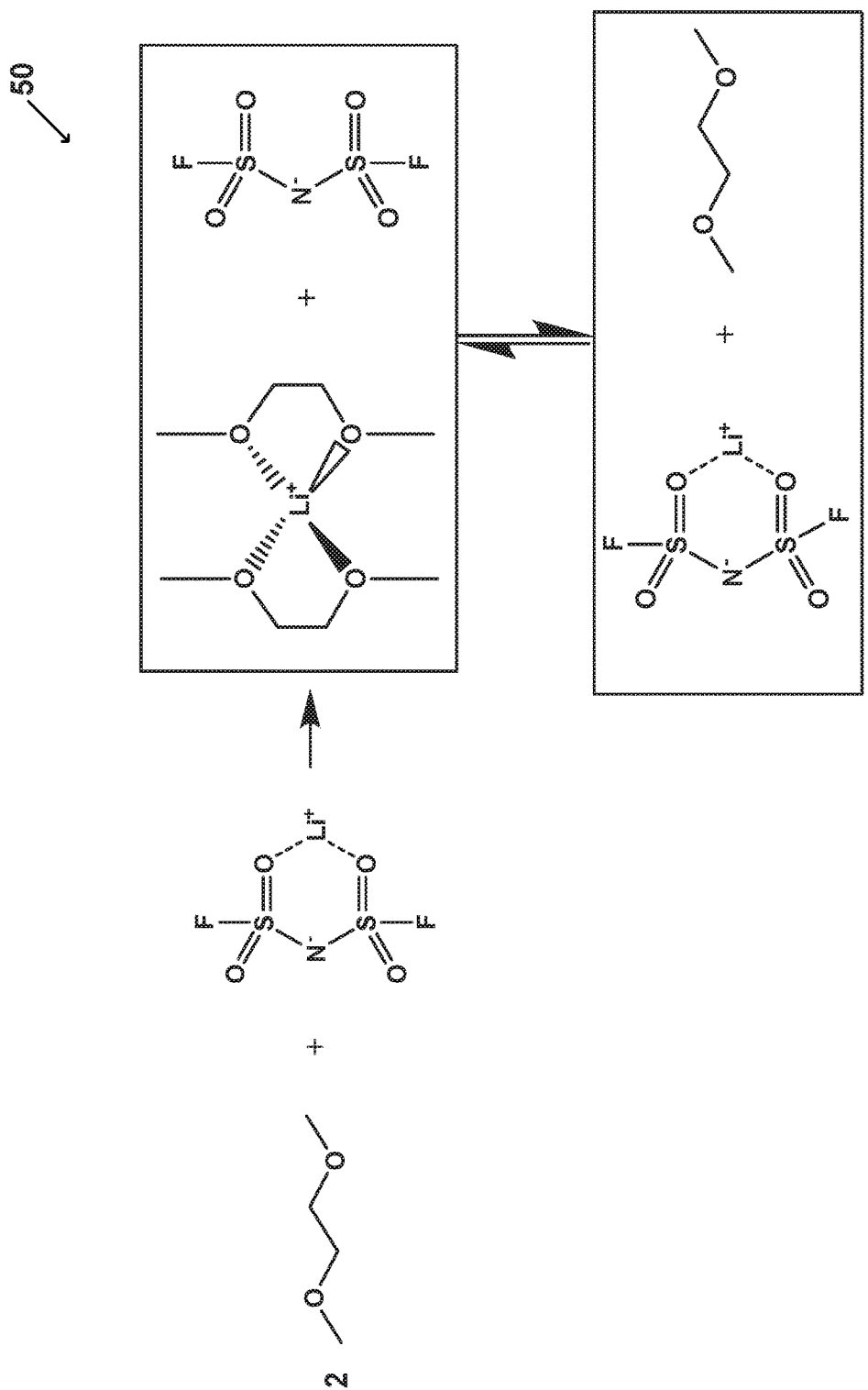
FIG. 3 shows an electrolyte system wherein one or more salts have a concentration in the electrolyte system of less than about 4M.

FIG. 3 illustrates a comparative electrolyte system 50 having a salt concentration of less than about 4M. Electrolyte system 50 includes a concentration of lithium bis(fluorosulfonyl)imide (LiFSI) of less than about 4M and a molar ratio of the lithium bis(fluorosulfonyl)imide (LiFSI) to the dimethoxyethane (DME) of about 0.4 (e.g., LiFSI:DME=1:2.5). As shown, in such instances, a state of equilibrium exists between [$Li^+$ (2 dimethoxyethane (DME))+free bis(fluorosulfonyl)imide ($FSI^-$)] and [$Li^+$ (dimethoxyethane (DME)+bis(fluorosulfonyl)imide ($FSI^-$))+ free dimethoxyethane (DME)]. The free or unbound bis(fluorosulfonyl)imide ($FSI^-$) is highly reactive with lithium (Li) and may cause low lithium (Li) cycling efficiency (e.g., about 98.4% efficiency). The free or unbound dimethoxyethane (DME) may react with high voltage (greater than about 4V) cathodes and may thereby cause low full cell efficiency (e.g., less than about 99.5%). More particularly, free dimethoxyethane (DME) may oxidized on one or more surfaces of the cathode forming an internal redox species that can lead to low columbic efficiency.

Figure 4:
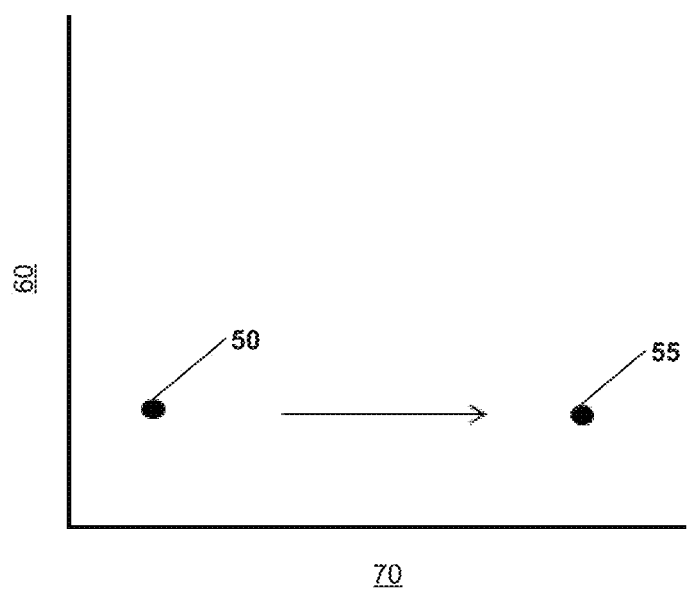
FIG. 4 is a graphical illustration of electron affinities and ionization potentials of comparative electrolyte systems.

Thus, providing electrolyte systems 55 with higher concentrations of salts can enhance anodic stability and provide the ability to use higher voltage cathodes by binding completely the one or more salts and solvent. As seen in FIG. 4, the presence of the bound moiety in electrolyte system 55 increases the ionization potential (eV) of the electrolyte system 55 without increasing the electron the electron affinity (eV). The y-axis or vertical-axis 60 of FIG. 4 depicts the electron affinity (eV), while the x-axis or the horizontal-axis 70 depicts the ionization potential (eV). Electrolyte system 55 including the bound moiety may have a calculated electron affinity of less than or equal to about 1.5 eV and a calculated ionization potential of greater than or equal to about 10 eV. While electrolyte system 50 not including a bound moiety may have a calculated electron affinity of less than or equal to about 1.5 eV and a calculated ionization potential of less than or equal to about 8 eV, and in certain instances, optionally less than or equal to about 7.2 eV.

Resulting from the suppression or minimization of free or unbound dimethoxyethane (DME) and free or unbound bis(fluorosulfonyl)imide (FSL), a battery including electrolyte system 55 may include a high-voltage positive electrode. having a maximum potential greater than or equal to about 4V, optionally greater than or equal to about 4.8V, and in certain aspects, optionally greater than or equal to about 5V. For example, the positive lithium-based electroactive material of the positive electrode may be selected from the group consisting of nickel-manganese-cobalt 811 (NMC811); nickel-manganese-cobalt 622 (NMC622); lithium cobalt oxide (LiCoO$_2$); lithium iron phosphate (LiFePO$_4$); high-energy nickel-manganese-cobalt-oxide (HENMC) (e.g., over-lithiated layered oxide cathode or lithium-rich NMC); lithium-manganese-nickel-oxide (LMNO); and combinations thereof.

EXAMPLE 2

Figure 5:
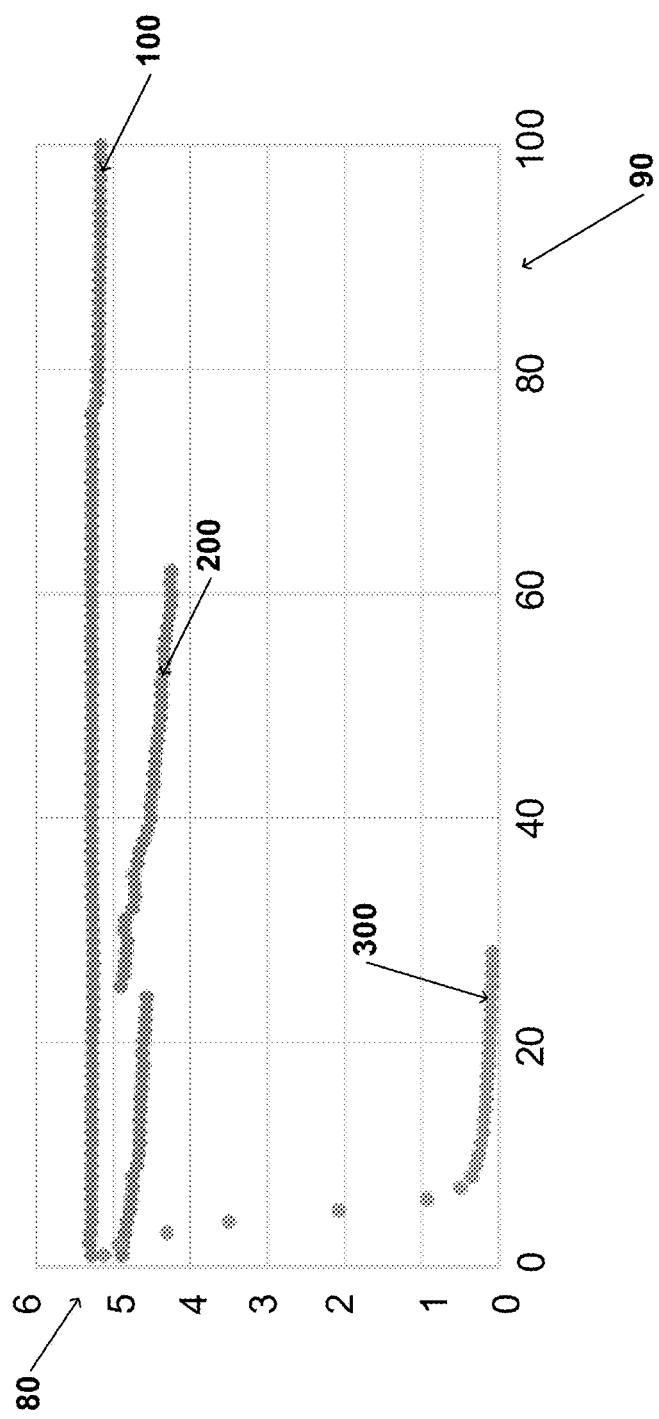
FIG. 5 is a graphical illustration of the capacity retention per cycle of example electrochemical cells.

FIG. 5 shows the charging and discharging profiles (e.g., cycle life) of comparative high-capacity 20 µm Li-NMC 622 electrochemical cells 100, 200, and 300 including negative electrodes comprising metallic lithium and varying electrolyte systems comprising lithium bis(fluorosulfonyl)imide (LiFSI) and dimethoxyethane (DME). The y-axis or vertical-axis 80 depicts the capacity retention in milliamp hour (mAh), while the cycle number is shown on the x-axis 90. Electrochemical cell 100 includes an electrolyte system prepared in accordance with certain aspects of the present disclosure. In particular, the electrolyte system of electrochemical cell 100 includes a bound moiety and has a lithium bis(fluorosulfonyl)imide (LiFSI) salt concentration of about 5M and a molar ratio the lithium bis(fluorosulfonyl)imide (LiFSI) to the dimethoxyethane (DME) of about 1. The electrolyte system of electrochemical cell 200 has a lithium bis(fluorosulfonyl)imide (LiFSI) salt concentration of about 4M, and the electrolyte system of electrochemical cell 300 has a lithium bis(fluorosulfonyl)imide (LiFSI) salt concentration of about 1.5M.

As seen electrochemical cell 100 has improved long term performance over electrochemical cells 200 and 300. More particularly, electrochemical cell 200 having a salt concentration of about 4M shows fast capacity drop, while electrochemical cell 300 having a salt concentration of about 1.5M is unable to sustain a stable cycle. Accordingly, electrochemical cell 100 prepared in accordance with certain aspects of the present disclosure shows significant improved cycling performance and reduced capacity fade. The electrolyte system of electrochemical cell 100 is compatible with both negative electrodes (e.g., anodes) comprising metallic lithium and NMC cathodes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical cell that cycles lithium-ions having improved or optimized capacity retention and anodic stability comprising:
    a positive electrode comprising a positive lithium-based electroactive material selected from the group consisting of nickel-manganese-cobalt 811 (NMC811), nickel-manganese-cobalt 622 (NMC 622), and combinations thereof and having a maximum potential greater than or equal to about 5V;
    a separator;
    a negative electrode comprising a negative electroactive material including lithium; and
    an electrolyte system comprising a bound moiety having an ionization potential that is greater than its electron affinity and an electrolyte additive comprising 1H,1H,2H,2H-perfluorooctyltrimethoxysilane;
        wherein the bound moiety comprises one or more salts bound to a solvent,
        wherein the one or more salts is selected from the group consisting of: lithium bis(fluorosulfonyl)imide (LiFSI), sodium bis(fluorosulfonyl)imide (NaFSI), potassium bis(fluorosulfonyl)imide (KFSI), and combinations thereof and the solvent comprises dimethoxyethane (DME),
        wherein the one or more salts have a concentration in the electrolyte system of greater than 5 M and a molar ratio of the one or more salts to the dimethoxyethane (DME) is greater than or equal to about 1 to less than or equal to about 1.5, and
        wherein the electrolyte system is substantially free of unbound dimethoxyethane (DME) and unbound bis(fluorosulfonyl)imide (FSI$^-$).

2. The electrochemical cell of claim 1,
    wherein the positive lithium-based electroactive material further includes elemental sulfur or a sulfur-containing active material.

3. The electrochemical cell of claim 1,
    wherein the positive lithium-based electroactive material further includes a material selected from the group consisting of lithium cobalt oxide (LiCoO$_2$); lithium iron phosphate (LiFePO$_4$); nickel-manganese-cobalt-oxide; lithium-manganese-nickel-oxide (LMNO); and combinations thereof.

4. The electrochemical cell of claim 1, wherein the electrolyte system has a dynamic viscosity of less than about 100 centipoise (cP), and the electrochemical cell has an energy density of greater than about 900 Wh/L.

5. The electrochemical cell of claim 1, wherein the electrolyte system includes one or more electrolyte additives selected from the group consisting of: 3,3,3-trifluoropropylmethyldimethoxysilane, (3,3,3-trifluoropropyl)trimethoxysilane, 1H,1H,2H,2H-perfluorooctylmethyldimethoxysilane, 1H,1H,2H,2H-perfluorooctyltrimethoxysilane, 1H,1H,2H,2H-perfluorooctylmethyldichlorosilane, (1H,1H,2H,2H- perfluoro-n-hexyl)methyldichlorosilane, 1H,1H,2H,2H-perfluorooctyltrichlorosilane, or combinations thereof.

6. A method of preparing an electrolyte system that enhances or optimizes capacity retention and an anodic stability of an electrochemical cell comprising a positive electrode comprising a positive lithium-based electroactive material selected from the group consisting of nickel-manganese-cobalt 811 (NMC811), nickel-manganese-cobalt 622 (NMC 622), and combinations thereof and having a maximum potential greater than or equal to about 5V and a negative electrode having a negative electroactive material comprising lithium, the method comprising:

mixing one or more salts selected from the group consisting of: lithium bis(fluorosulfonyl)imide (LiFSI), sodium bis(fluorosulfonyl)imide (NaFSI), potassium bis(fluorosulfonyl)imide (KFSI), and combinations thereof; an electrolyte additive comprising 1H,1H,2H,2H-perfluorooctyltrimethoxysilane; and a solvent comprising dimethoxyethane (DME), wherein the one or more salts and the solvent form a bound moiety having an ionization potential that is greater than its electron affinity, wherein the electrolyte system is substantially free of unbound dimethoxyethane (DME) and unbound bis(fluorosulfonyl)imide (FSI$^-$), and wherein the one or more salts have a concentration in the electrolyte system of greater than 5 M and a molar ratio of the one or more salts to the dimethoxyethane (DME) is greater than or equal to about 1 to less than or equal to about 1.5.

7. The method of claim 6,
wherein the positive lithium-based electroactive material further includes elemental sulfur or a sulfur-containing active material.

8. The method of claim 6,
wherein the positive lithium-based electroactive material further includes a material selected from the group consisting of lithium cobalt oxide (LiCoO$_2$); lithium iron phosphate (LiFePO$_4$); nickel-manganese-cobalt-oxide; lithium-manganese-nickel-oxide (LMNO); and combinations thereof.

9. The method of claim 6, wherein the electrolyte system has a dynamic viscosity of less than about 100 centipoise (cP), and the electrochemical cell has an energy density of greater than about 900 Wh/L.

10. The method of claim 6, wherein the electrolyte additive further comprises one or more additives selected from the group consisting of: 3,3,3-trifluoropropylmethyldimethoxysilane, (3,3,3-trifluoropropyl)trimethoxysilane, 1H,1H,2H,2H-perfluorooctylmethyldimethoxysilane, 1H,1H,2H,2H-perfluorooctyldimethylchlorosilane, 1H,1H,2H,2H-perfluorooctylmethyldichlorosilane, (1H,1H,2H,2H-perfluoro-n-hexyl)methyldichlorosilane, 1H,1H,2H,2H-perfluorooctyltrichlorosilane, and combinations thereof.

* * * * *